United States Patent [19]

Yata et al.

[11] 4,418,986
[45] Dec. 6, 1983

[54] REAR PROJECTION SCREEN

[75] Inventors: Yukio Yata, Chiba; Koichi Inagaki, Hoya, both of Japan

[73] Assignee: Mitsubishi Rayon Co., Ltd., Japan

[21] Appl. No.: 364,193

[22] Filed: Mar. 31, 1982

[30] Foreign Application Priority Data

Apr. 7, 1981 [JP] Japan .................................. 56-51194
Jun. 12, 1981 [JP] Japan .................................. 56-90544

[51] Int. Cl.³ .............................................. G03B 21/60
[52] U.S. Cl. ...................................... 350/128; 350/129
[58] Field of Search ......................... 350/117, 127–129

[56] References Cited

U.S. PATENT DOCUMENTS 2,510,344 6/1950 Law .
2,529,701 11/1950 Maloff .
2,738,706 3/1956 Thompson, Jr. .
2,870,673 1/1959 Schwesinger .
3,218,924 11/1965 Miller .
3,257,900 6/1966 Goodbar et al. .
3,279,314 10/1966 Miller .
3,830,556 8/1974 Bratkowski .......................... 350/128

FOREIGN PATENT DOCUMENTS 81301520.3 4/1981 European Pat. Off. .
2276605 5/1972 France .
98590 5/1921 Switzerland .
656651 2/1962 United Kingdom .

Primary Examiner—Richard A. Wintercorn
Attorney, Agent, or Firm—Brumbaugh, Graves, Donohue & Raymond

[57] ABSTRACT

Provided is a rear projection screen having a front surface receiving light rays from a projector and a viewing surface formed with a lenticulated surface in which lenticules each consisting of a crest, a trough and a flank interconnecting the crest and trough are continuously laid. The flank surface is provided with, on at least a part thereof, a total reflecting surface on which all light rays impinging thereto are reflected and then emanate from the crest through a medium interface thereof.

15 Claims, 17 Drawing Figures

REAR PROJECTION SCREEN

BACKGROUND OF THE INVENTION

The present invention relates to a rear projection screen suitable for use as, for example, a screen for video projectors and, more particularly, to a rear projection screen having a greater angular field of vision on the viewing side and an increased brightness. Still more particularly, the invention is concerned with a lenticular lens for use in a rear projection screen of the type mentioned above.

Rear projection screens have been widely available for video projectors, microfilm readers and computer display systems, and various studies and attempts have been made for improving the light transmitting characteristics of the rear projection screen for attaining a greater angular field of vision, higher contrast and higher resolution. As a measure for achieving these objects, it has been proposed to use, solely or in combination with a lens or a diffusion plate, a lenticulated surface having a multiplicity of minute cylindrical lenses (lenticules) arranged continually.

This lenticulated surface is effective in diffusing the light impinging thereon. More specifically, a lenticulated surface having a multiplicity of minute vertically extending cylindrical lenses arranged continually on a vertical plane laterally diffuses the light, while the lenticulated surface having a multiplicity of minute horizontally extending cylindrical lenses arranged continually on a vertical plane longitudinally diffuses the light. When this lenticulated surface is used as a screen, the maximum diffusion angle is varied largely depending on whether the lenticulated surface is faced to the incident light, i.e. towards the light source or to the viewer. Namely, as is known to those skilled in the art, it is possible to obtain a greater diffusion angle when the surface is faced to the light source than when the same is faced to the viewer.

In general, however, each lenticule of the lenticulated surface of the kind described has a circular cross-section so that the angle of diffusion of light is considerably small. In consequence, the brightness is drastically lowered disadvantageously in the region of viewing angles exceeding 30°, as will be seen from FIG. 14. This reduction of brightness causes not only the problem that the picture surface is darkened when viewed from the region out of the viewing angle of 30° but also a problem that the picture surface becomes completely invisible due to a surface reflection in bright circumstance under the influence of ambient light.

SUMMARY OF THE INVENTION

Accordingly, an object of the invention is to overcome the above-described problems of the prior art by providing a novel rear projection screen.

To this end, according to the invention, there is provided a rear projection screen having a lenticulated surface formed on at least the viewing side surface of a medium (a transparent optical medium), and wherein the lenticulated surface includes lenticules each having a crest and troughs interconnected through flanks, wherein at least a portion of the flank is provided with a total reflection surface so that the all light rays impinging thereon or upon are totally reflected and emanate through the crest.

The invention aims, as another object a at providing a rear projection screen which can be readily cast or moulded, while having, in addition to the peculiar total reflection characteristics mentioned above, a great diffusion effect by the lenticules.

This object is achieved by a rear projection screen having a plurality of lenticules formed at least on the viewing side surface of the medium, each lenticule having a crest and troughs interconnected through flanks, wherein at least a portion of the flank is provided with a total reflection surface such that the light rays impinging thereon or upon are totally reflected and emanate through the crest, and wherein the crest and/or the trough is provided with a lens surface.

The present invention will be more readily understood from the following description of the preferred embodiments thereof with reference to the accompanying drawings.

DESCRIPTION OF THE PREFERRED EMBODIMENTS

Figure 17:
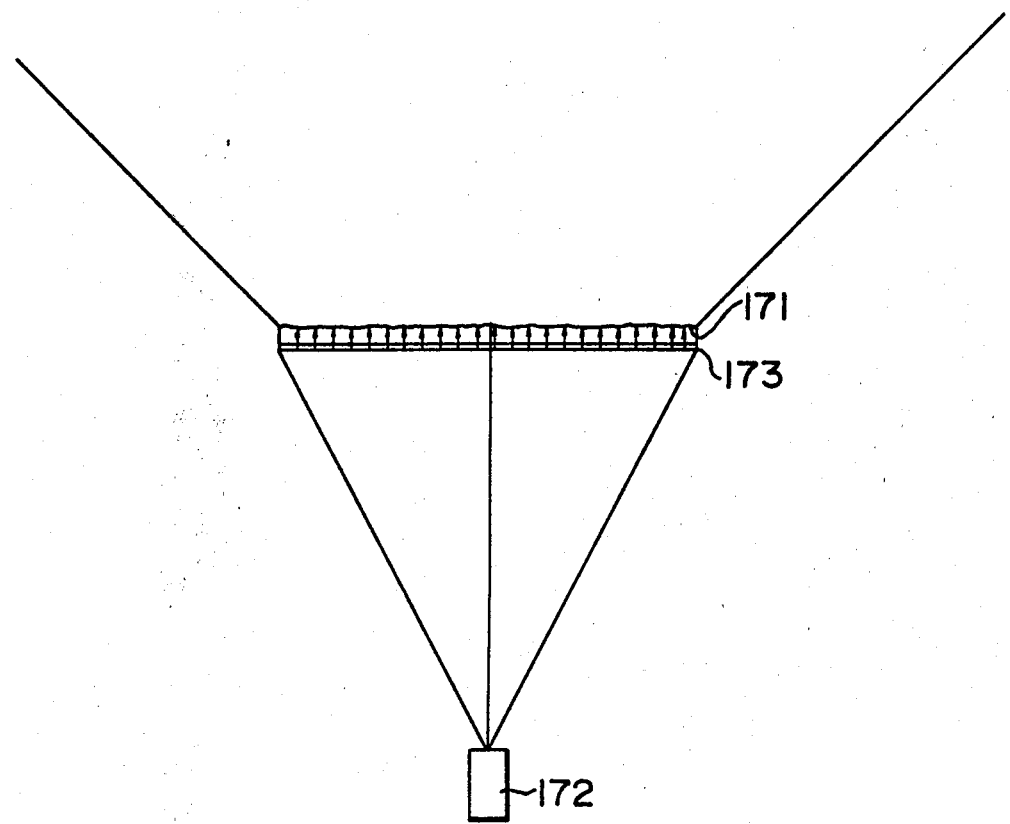
FIG. 17 is a plan view illustrating a general arrangement of a projection system using the rear projection screen embodying the present invention.

Before the embodiments of the present invention are described, the general arrangement of a projection system using a rear projection screen embodying the present invention will be first explained with specific reference to FIG. 17.

In FIG. 17, light rays diverging from a projector 172 impinge upon the rear surface of a rear projection screen 171 through a Fresnel lens 173 which converts the diverging light rays into parallel light rays. The light rays transmitted through the medium of the rear projection screen 171 in parallel relation are dispersed from the front surface of the rear projection screen 171 in a suitable viewing angle.

Hereinafter, preferred embodiments of the invention will be described with reference to the accompanying drawings.

Figure 1:
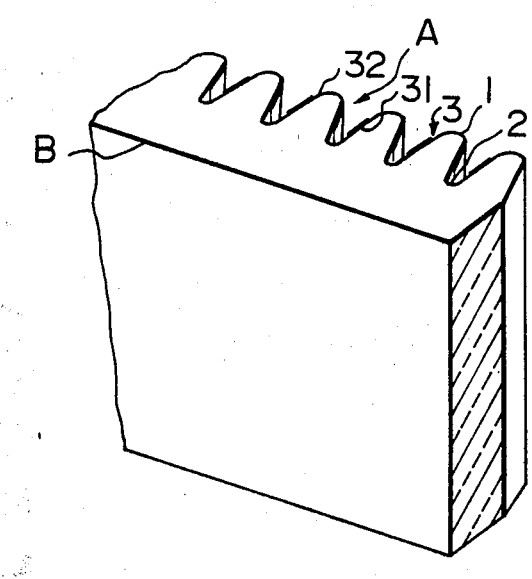
FIG. 1 is a perspective view of a rear projection screen provided with a lenticulated surface which includes lenticules each having a crest, troughs and flank portions in accordance with an embodiment of the linvention, wherein at least a portion of each flank portion is formed with a total reflection surface.
Figure 2:
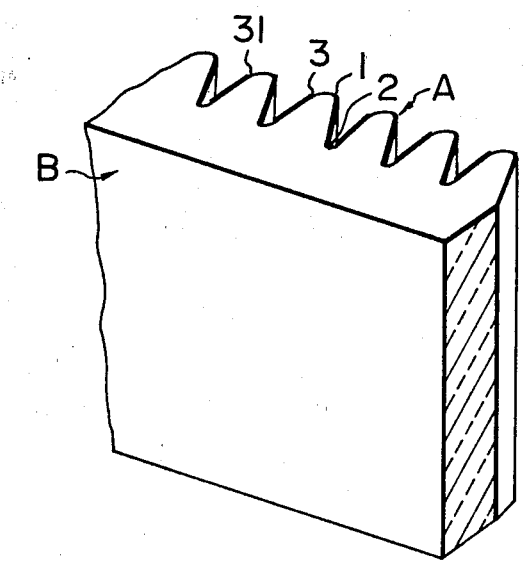
FIG. 2 is a perspective view of screen as a modified form of the rear projection screen shown in FIG. 1; in which the flank portion has a different form.
Figure 3:
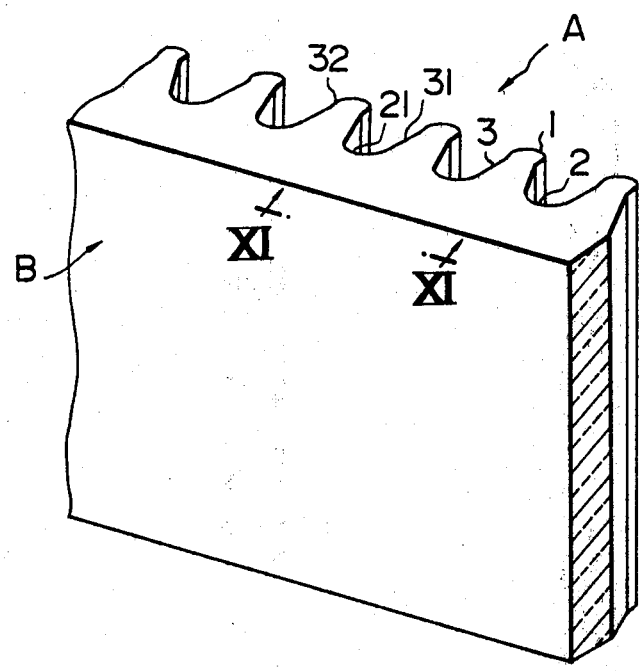
FIG. 3 is a perspective view of another embodiment in which concaved lenses are formed on the trough portions of the lenticules of the rear projection screen shown in FIG. 1.
Figure 4:
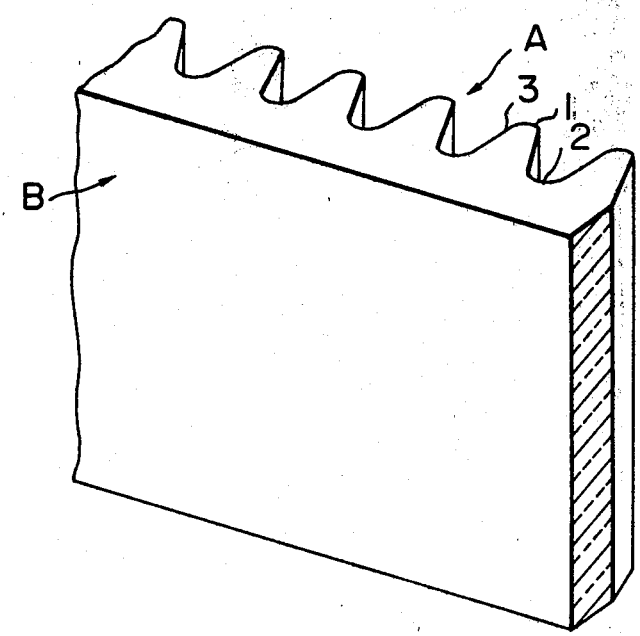
FIG. 4 is a perspective view of still another embodiment in which concaved lenses are formed on the trough portions of the lenticules of the rear projection screen shown in FIG. 2.
Figure 5:
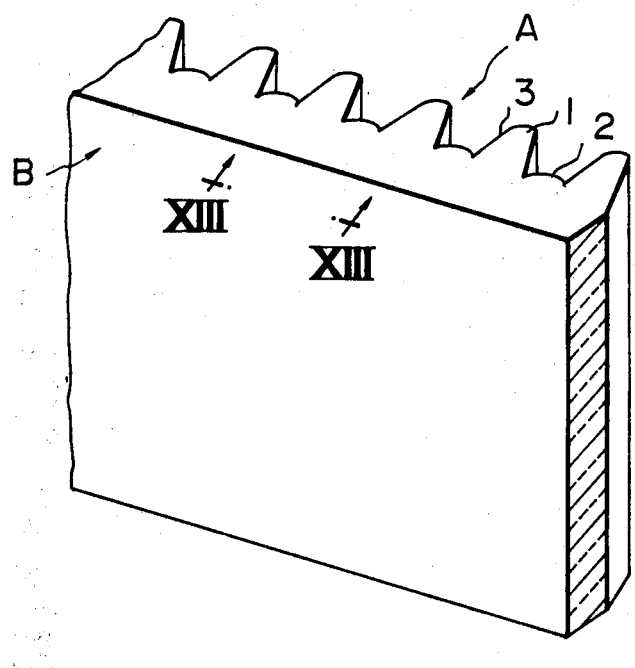
FIG. 5 is a perspective view of a further embodiment in which convexed lenses are formed on the trough portions of the lenticules of the rear projection screen shown in FIG. 2.

FIGS. 1 to 5 are perspective views of rear projection screens embodying the invention. As will be seen from these Figures, the rear projection screen of the invention is provided on its viewing side surface a lenticulated surface formed by a plurality of lenticules each having a crest 1 and troughs 2 interconnected by intermediate flanks 3. As will be explained later, at least a portion of each flank 3 is provided with a total reflecting surface such that the light rays impinging thereon are totally reflected and then emanate through the crest 1. FIGS. 1 to 5 show practical embodiments of the rear projection screen of the invention. More specifically, FIG. 1 shows an embodiment in which a major part of each flank 3 constitutes a total reflecting surface 31, leaving small portions of non-reflecting surfaces 32. FIG. 2 shows another embodiment in which the entire portion or part of each flank 3 constitutes a total reflecting surface 31. FIG. 3 shows still another embodiment in which concaved lens surfaces 21 are formed in the troughs 2 of the embodiment shown in FIG. 1. FIG. 4 shows a further embodiment in which concaved lens surfaces 21 are also formed in the troughs 2 of the embodiment shown in FIG. 2. Finally, FIG. 5 shows a further embodiment in which, in place of the concaved lens surfaces 21 in the embodiment shown in FIG. 4, convexed lens surfaces 22 are formed.

Figure 6:
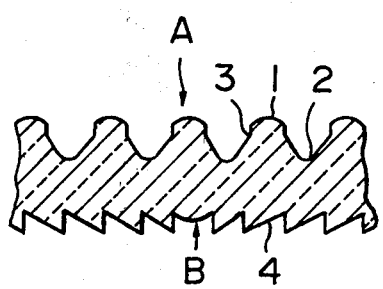
FIG. 6 is a sectional view of a still further embodiment in which a Fresnel lens is formed on the projecting side surface of the rear projection screen shown in FIG. 3.
Figure 7:
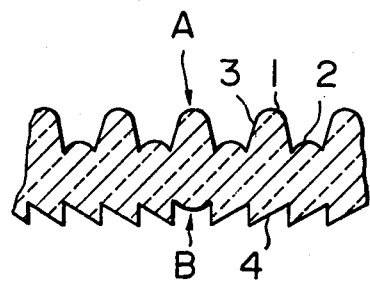
FIG. 7 is a sectional view of a still further embodiment in which a Fresnel lens is formed in the projecting side surface of the rear projection screen shown in FIG. 5.

In these embodiments, the projecting side surface B of the rear projection screen is flat and smooth. It is, however, effective to form a Fresnel lens on the projecting side surface. FIGS. 6 and 7 are sectional views of embodiments in which a Fresnel lens is formed on the projecting side surface of the rear projection screen. More specifically, FIG. 6 shows a still further embodiment in which a Fresnel lens 4 is formed on the projecting side surface of the embodiment shown in FIG. 3, while FIG. 7 shows a still further embodiment in which a Fresnel lens 4 is formed on the projecting side surface B of the embodiment shown in FIG. 5.

The Fresnel lens in this case is generally a circular Fresnel lens and the focal length thereof varies depending on applications of the screen. In the case of a rear projection screen for a large-size video projector, for example, the focal length f is usually between 1.0 and 1.2 m. The Fresnel lens 4 can also be incorporated in the embodiments shown in FIGS. from 1 through 4.

Figure 8:
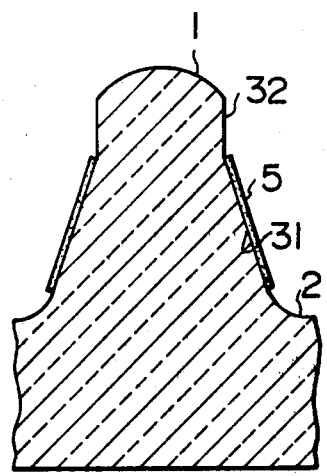
FIG. 8 is a sectional view of a still further embodiment in which a light absorbing layer is formed on the total reflecting surface of the rear projection screen shown in FIG. 3.
Figure 9:
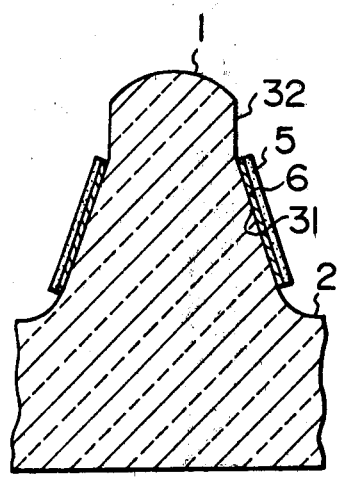
FIG. 9 is a sectional view of a still further embodiment in which a coating layer and a light absorbing layer are laminated on the total reflecting surface of the rear projection screen shown in FIG. 3.

FIGS. 8 and 9 show still further embodiments improved to increase the image contrast on the rear projection screen. Namely, in the embodiment shown in FIG. 8, a light absorbing layer 5 is formed on the total reflecting surface 31. On the other hand, FIG. 9 shows an embodiment in which, in order to prevent the absorption loss in the light absorbing layer 5, a coating layer 6 of a substance having a smaller refractive index than the medium is formed beforehand on the total reflecting surface and then the light absorbing layer 5 is formed on the coating layer 6. In the embodiments shown in FIGS. 8 and 9, it is possible to make effective use of the total reflecting surface 31 which does not directly transmit the light therethrough to the viewing side surface A, so that the contrast of the image on the rear projection screen is improved considerably. Although these two embodiments for obtaining higher contrast are explained in connection with the embodiment shown in FIG. 3, it will be clear to those skilled in the art that the above-explained construction for achieving higher contrast can equally be applied to all other embodiments described hereinbefore.

As has been described, a significant feature of the invention resides in the formation of a specific total reflecting surface 31 in each flank 3 of the lenticule. The light transmission characteristics of the flank having the total reflecting surface will be explained hereinunder with reference to FIGS. 10 through 13.

Figure 10:
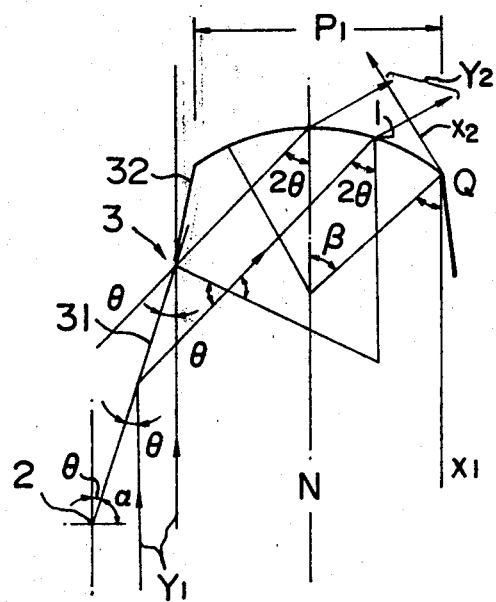
FIG. 10 is a chart for explaining the light transmission characteristics of a total reflection surface.
Figure 11:
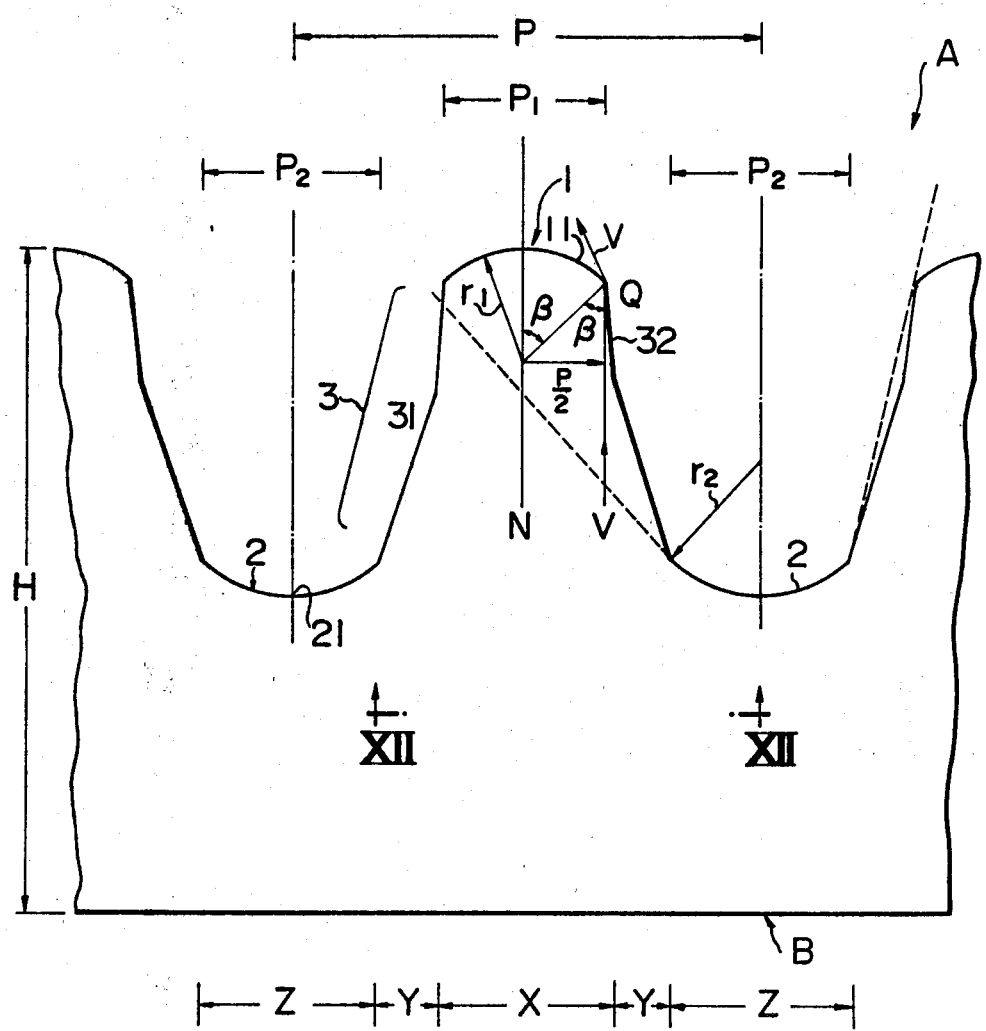
FIG. 11 is a chart for explaining the light transmission characteristics in the embodiment shown in FIG. 3.

FIG. 10 is an enlarged view of a portion of the lenticulated surface of a rear projection screen in accordance with the invention. In this case, the flank 3 is provided with a total reflecting surface 31 and non-reflecting surfaces 32. The non-reflecting surfaces 32 are intended for facilitating removal of the medium from the mold in the process of production of the screen. Preferably, the non-reflecting surface 32 is formed in parallel with the optical axis or at an inclination angle of 1° to 5° to the optical axis.

On the other hand, the total reflecting surface 31 is adapted to make a total reflection of a part of the light rays impinging on the medium and to make the same emanate from the crest 1. It is necessary, however, that the totally reflected light and the light directly impinging on the crest 1 are not totally reflected by the medium interface of the crest 1. The angle $\theta$ of inclination of the total reflecting surface 31 with respect to the optical axis is determined by the refractive index n of the medium. Hereinafter, an explanation will be made as to how the inclination angle $\theta$ is determined in relation to the refractive index n.

Referring to FIG. 10, light rays $Y_1$ and $X_1$ run in parallel with the normal axis N. The light ray $Y_1$ out of these two rays impinges on the total reflecting surface 31 at an angle $\theta$ and is totally reflected and emanates through the crest 1 as a ray $Y_2$. Thus, the total-reflected light intersects the normal axis N at an angle $2\theta$ and emanates through the crest 1.

In order that the whole part of the totally reflected rays emanates through the crest 1, it is essential that this ray should not be totally reflected by the medium interface of the crest 1. This means that the angle $2\theta$ must be smaller than the total reflection angle.

The relationship is expressed and determined as follows by the formula of total reflection.

$$n \sin 2\theta \leq 1$$

$$\sin 2\theta \leq \frac{1}{n}$$

$$2\theta \leq \sin^{-1}\frac{1}{n}$$

$$\theta \leq \frac{1}{2} \sin^{-1}\frac{1}{n}$$

From this relation, it is understood that the angle $\alpha$ formed between the total reflecting surface 31 and the horizontal plane has to meet the following condition.

$$\alpha \geq 90° - \frac{1}{2} \sin^{-1}\frac{1}{n}$$

The angle $\alpha$ of inclination of the total reflecting surface 31 is thus determined. Assuming that the medium is an acrylic resin having a refractive index n of 1.492, the angle $\alpha$ is calculated as follows:

$$\alpha \geq 90° - \frac{1}{2} \sin^{-1}\frac{1}{1.492}$$

$$\alpha \geq 90° - \frac{1}{2} 42.09°$$

$$\alpha \geq 68.96°$$

Thus, the angle $\alpha$ must be greater than about 69°. However, if the angle $2\theta$ of the ray passing through the crest 1 approaches the critical angle 42.09°, closely, the possibility of total reflection at the medium interface of the crest 1 is increased unfavourably, so that the angle $2\theta$ is preferably smaller than the critical angle. This means that the angle $\alpha$ preferably approximates 90°. A too large angle $\alpha$, however, makes the height of the crest excessively large in comparison with its width so as to make it difficult to form such a crest. Thus, the angle $\alpha$ is limited also from this point, and is preferably made small in order to facilitate the formation of the crest. As a compromise, therefore, the angle $\alpha$ is preferably selected to range between 70° and 80° when an acrylic resin is used as the medium (screen material).

A discussion will be made hereinunder as to the condition for eliminating total reflection of all rays at the crest 1. Representing the width of the crest 1 of the lenticule by $P_1$, the curvature of the medium interface by r and the rightmost end of the crest 1 by Q, the angle $\beta$ formed between the normal line r and the vertical line N is expressed as follows.

$$\sin \beta = \frac{\frac{P_1}{2}}{r} = \frac{P_1}{2r}$$

This angle is the angle of incidence of the ray $X_1$ parallel to the ray $Y_1$ and passing the point Q. Therefore, the design should be made to meet the following condition of $$\frac{P_1}{2r} \leq \sin \frac{1}{n}.$$

As has been described, by forming the total reflecting surface 31 on the flank 3, the light rays coming from the projecting side surface B are transmitted and largely diffused at the viewing side surface A. This phenomenon will be further described with reference to FIGS. 11 and 12. These Figures show the embodiment shown in FIG. 3 in a larger scale. In these Figures, there are shown crests 1, troughs 2 and flanks 3. Convexed lenses 11 are formed on the crests 1, while concaved lenses 21 are formed on the troughs 2. Also, the flank 3 is provided with a total reflecting surface 31.

As parallel light rays come into the lenticules having the above-described construction from the projecting side surface B, the ray impinging on the portion X corresponding to the crest 1 and the ray impinging on the portion Z corresponding to the trough 2 run straight through the medium, and are refracted and diffused at the surface of the convexed lens 11 on the crest 1 and the surface of the concaved lens 21 on the trough, respectively. This phenomenon will be explained in more detail with specific reference to FIG. 12.

The rays $X_1$ and $X_2$ which pass in the medium towards both marginal ends of the portion x of the crest 1 run straight and are refracted as illustrated when leaving the convexed lens surface 11 of the crest 1, while the rays $Z_1$ and $Z_2$ passing through both ends of the trough 2 are diffused. On the other hand, most portion of the rays coming into both ends of the portion Y of each flank 3, i.e. the rays in the region between $Y_1$ and $Y_2$ or between $Y_1$, and $Y_2$, are reflected on each total reflecting surface 31 and emanates through the convexed lens surface 11 on the crest 1.

Figure 12:
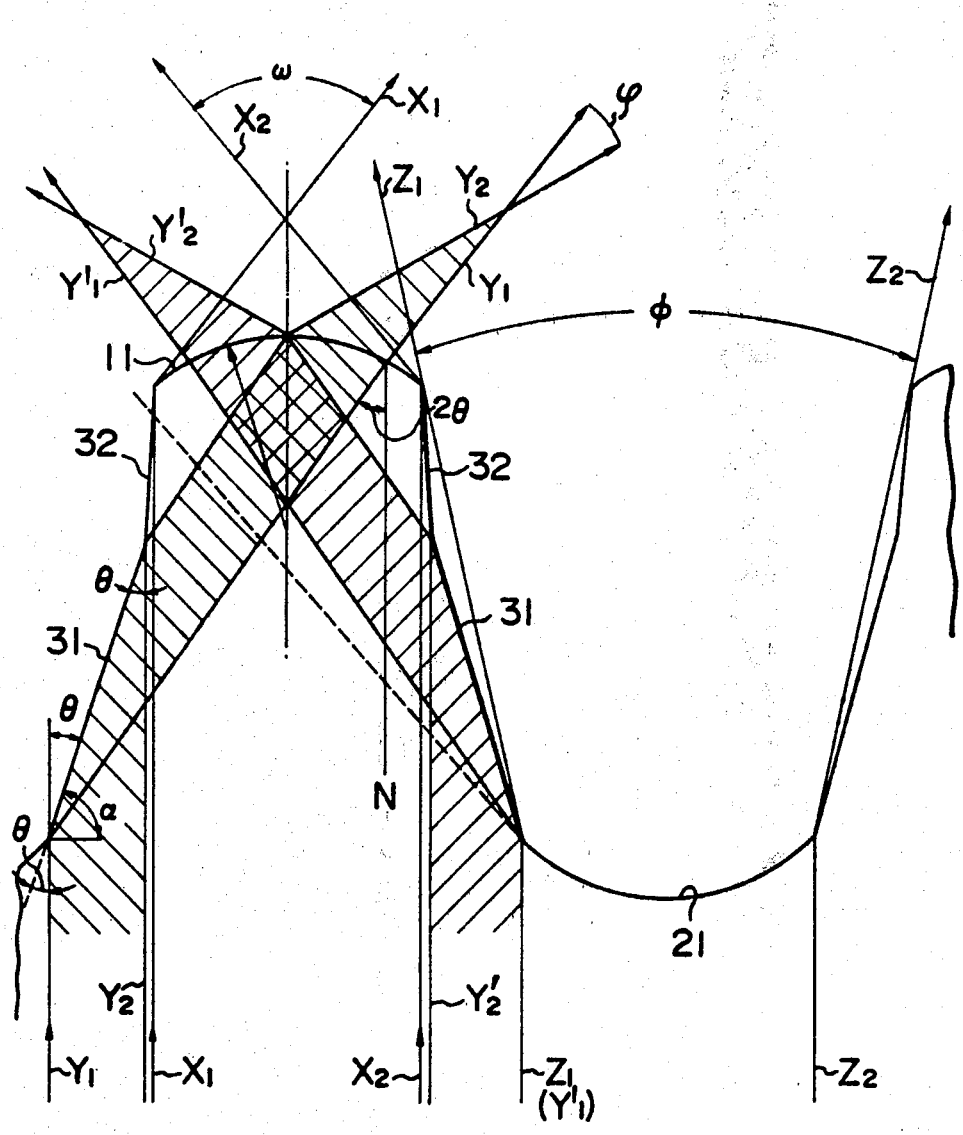
FIG. 12 is an illustration for explaining the characteristics shown in FIG. 11 in more detail.
Figure 15:
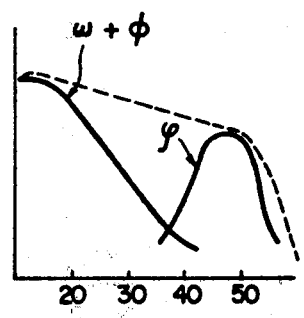
FIG. 15 is a graph showing the light transmitting characteristics shown in FIG. 12.

An explanation will be made hereinunder as to the uniformity of brightness within the region of projection angle of the projected rays, with specific reference to FIG. 12. If there is any non-uniformity in the brightness, the brightness of a picture element is varied depending on the direction of viewing of the picture element. Referring to FIG. 12, the rays passing through the convexed lens surface 11 are diffused within the range $\omega$ after emanating through the crest 1, as in the cases of rays $X_1$ and $X_2$. On the other hand, the rays coming into the total reflecting surface 31, i.e. the rays between the rays $Y_1$ and $Y_2$, are totally reflected and emanate through the crest 1 as strong light rays within the range $\phi$. On the other hand, the light rays which pass through the concaved lens surface 21 of the trough 2, i.e. the rays between $Z_1$ and $Z_2$, are diffused by the concaved lens surface 21 and emanate within the region $\emptyset$. The resultant rays in the regions $\omega$ and $\emptyset$ exhibit brightness characteristics $(\omega + \emptyset)$ shown in FIG. 15. As understood from this characteristics $(\omega + \emptyset)$, the brightness of the resultant rays is drastically lowered in the angle region exceeding 30° from the center line of the crest 11. On the other hand, the rays within the region $\phi$ reflecting from the total reflecting surface 31 and then emanating from the crest 11 form a strong light which represents brightness characteristics $\phi$ shown in FIG. 15. This ray advantageously compensates for the reduction of brightness in the above-mentioned characteristics $(\omega + \emptyset)$, thereby to further uniformalize the brightness within the reasonable viewing angle range. The curve shown by broken line in FIG. 15 shows total brightness characteristics due to $\omega$, $\emptyset$ and $\phi$ with the assistance of a light diffusing means which will be mentioned hereinunder. The most suitable optical system for obtaining these characteristics can be selected by properly selecting optimum values to factors such as the height of the flank 3, pitches P, $P_1$ and $P_2$ of the lenticules, and the focal lengths of the convexed lens surface 11 and the concaved lens surface 21.

Figure 13:
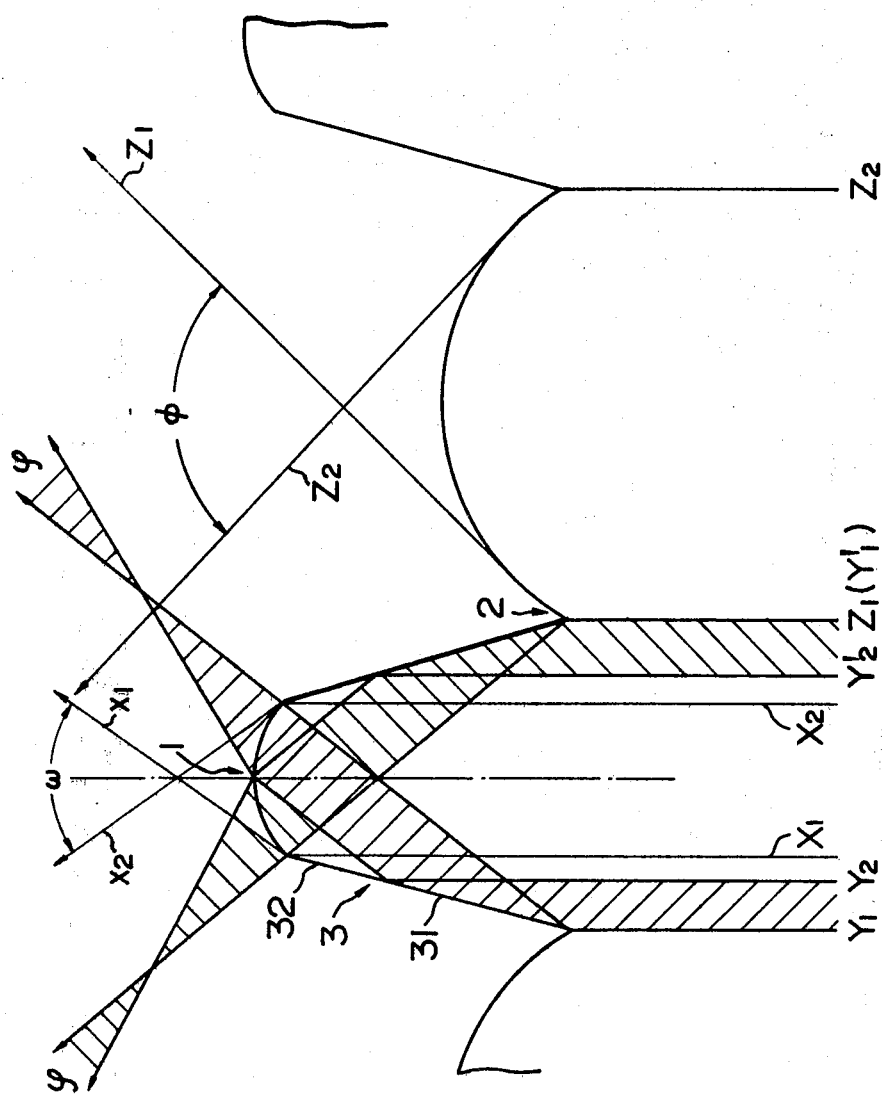
FIG. 13 is a chart for explaining the light transmission characteristics in the embodiment shown in FIG. 5.
Figure 14:
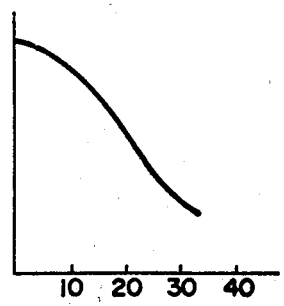
FIG. 14 is a graph showing the light transmitting characteristics of a conventional lenticulated surface with the relative brightness of transmitted light plotted against viewing angle in degrees.

FIG. 13 shows the optical system of the rear projection screen as shown in FIG. 7. The rays in the range between $Y_1$ and $Y_2$ among the parallel light rays coming from the projecting side are totally reflected and emanate, within the region $\phi$, from the crest. On the other hand, the rays in the range between $Z_1$ and $Z_2$ are diffused as rays within the region $\emptyset$ after passing the focal point. Also, as shown in FIG. 12, the rays in the range between $X_1$ and $X_2$ are diffused as illustrated within the region $\omega$. The rays between $Y_2$ and $X_1$ and the rays between $X_2$ and $Y_{2'}$ are made to partially emanate and partially repeat reflection and refraction before emanation to the outside.

Figure 16:
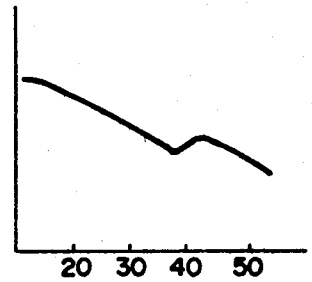
FIG. 16 is a graph showing the light transmitting characteristics shown in FIG. 13.

In this rear projection screen, the rays the region $\phi$ from the total reflecting surface 31 serves to increase the angle of field of vision and provides, in combination with the other rays within the region $\emptyset$ and $\omega$, brightness characteristics as shown in FIG. 16.

In the foregoing description of the embodiment, the material of the medium is stated as being an acrylic resin. This is because the acrylic resin exhibits superior optical properties and easy processability. It is possible, however, to use other materials such as vinyl chloride resins, polycarbonate resins, olefin resins, stylene resins and so forth. With these synthetic resins, the rear projection screen of the invention can be produced by extrusion, heat press, injection molding and so forth.

The dimensions of the parts of the screen may vary depending on the screen's application. For information, in the case of the lenticules of the screen shown in FIG. 11, the width $P_1$ of the crest 1 is selected to range between 0.2 and 1.5 mm, while the width $P_2$ of the trough 2 is selected to be between 0.3 and 1.5 mm. Thus, the pitch P is selected to fall between 0.5 and 3 mm, while the height H is selected to range between 0.2 and 2 mm.

The rear projection screen of the invention can easily be formed even when the lenticulated surface has a narrow or restricted trough 2 as in the case of screens shown in FIGS. 1 and 2. From the view point of manufacture, however, it is preferred that the lens surface is formed also in the trough 2 as in the case of the embodiments shown in FIGS. 3 thru 7, because of ready removal from the mold as compared with the case where the crests are interconnected through the flank to the comparatively narrow trough 2. The flank 3 need not always be straight but can have a curvilinear profile.

In order to further increase the diffusion of light in both vertical and horizontal directions in the rear projection screen, it is advisable to provide the medium with additional light diffusing means. For instance, it is possible to uniformly mix and disperse in the medium one, two or more additives which are neither molten in the liquid medium such as molten acrylic resin nor make chemical reaction therewith. Examples of such additives are inorganic diffusion agents such as $SiO_2$, $CaCO_3$, $Al_2O_3$, $TiO_2$, $BaSO_4$, $ZnO$ and fine powdered glass, and organic diffusion agents such as polystylene, stylene-acrylonitrile copolymer or the like. It is also effective to form a layer containing such diffusion agents. Alternatively, minute roughness is made in the incidence surface or the surface of the crest. By employing such diffusion means, it is possible to effect a greater diffusion of light in the angular region of $\omega$ and $\phi$ in FIG. 12, and also to increase the diffusion of light in the vertical direction in FIG. 1.

It is also effective to add a suitable dye or pigment in the medium to control the color tone. As a measure for preserving a large diffusion of light in the vertical direction, it is effective to integrally in corporate a horizontally extending cylindrical lenses (lenticules) with the above-mentioned lenticules (lenticules).

The contrast of the picture element is reduced by ambient light impinging on one side surface of the screen. In order to avoid such a reduction in the contrast, it is possible to enhance the contrast of the picture element by forming, on the total reflection surface 31, a light absorbing layer 5 which prevents the transmission of light, as in the case of the embodiment shown in FIG. 8. There is a fear, however, that the light absorbing layer 5 inconveniently absorbs a part of the light reflected by the total reflection surface 31, although such a part is negligibly small. In order to avoid such an absorption of light, it is preferred to form on the total reflection surface a coating layer 6 of a refractive index smaller than that of the medium and then provide the light absorbing layer 5 on the coating layer 6. By so doing, it is possible to eliminate the absorption of even a small part of the light reflected by the total reflection surface 31 and to project the rays from the picture elements more effectively. As the material having smaller refractive index, for example, it is possible to use a resin containing fluorine when the medium is made of an acrylic resin. It is possible to use a reflecting layer of, for example, aluminum as the coating layer 6.

Practical examples of rear projection screens of the invention are shown below.

EXAMPLE 1

A sheet of 3 mm thick was formed from a material mainly consisting of a partially polymerized methacrylate with an additive of $SiO_2$ as a diffusion agent. With this sheet, a screen having lenticules on the projecting side surface as shown in FIG. 1 was formed by a heat press. The pitch of the lenticules was 0.75 mm, the radius of curvature of the crest was 0.4 R and the angle $\alpha$ was 70°. Also, the focal length f of the Fresnel lens was 1.2 m.

Brightness characteristics of the thus formed screen were evaluated. It was confirmed that the value Go and the angle $\beta$ are 8 and 24°, respectively. The screen exhibited a superior performance to make the image visible over a wide angle of field of vision which materially exceeds 55°.

EXAMPLE 2

Using a similar sheet as Example 1, a screen was formed by a heat press to have lenticules substantially identical to those in FIG. 2 and provided in the projecting side surface thereof with a Fresnel lens similar to that of Example 1. The pitch and height of the lenticules were 0.7 mm, while the angle $\alpha$ 75°. The Go value and the angle $\beta$ were 5.3 and 22°, respectively, but the screen showed good characteristics to make the image visible within the range of angle of field of vision up to 50°.

EXAMPLE 3

Using a similar sheet as Example 1, a screen having a form substantially equal to that shown in FIG. 7 was formed. The pitches of the lenticules having the total reflection surfaces was 0.5 mm., the pitch of the circular lenticules was 0.7 mm and the height was 0.5 mm. The angle $\alpha$ and the focal length f of the Fresnel lens were 75° and 1.2 m, respectively. The thus obtained screen showed high Go value and large angle $\beta$ which are 6.6 and 32°, respectively. The screen had good performance to make the image visible over a wide angle of field of vision of up to 60°, advantageously.

What is claimed is:

1. A rear projection screen having a viewing side surface, a projection side surface and a medium therebetween and having a plurality of lenticules which are formed on said viewing side surface so as to form a lenticulated surface thereon, said each lenticule comprising a crest and trough portions interconnected by flank portions wherein at least a portion of each flank has a total reflection surface so that all light rays impinging on said flank are reflected by said total reflection surface and emanate through said medium at portions other than said flank portions.

2. A rear projection screen having a viewing side surface, a projection side surface and a medium therebetween and having a plurality of lenticules which are formed on said viewing side surface so as to form a lenticulated surface, said each lenticule comprising a crest and trough portions interconnected by flank portions wherein at least a portion of each flank has a total reflection surface so that all light rays impinging on said flank are reflected by said total reflection surface and emanate through the crest portion, and wherein at least one of said crest and trough portions are provided with a lens surface.

3. A rear projection screen as claimed in claim 1 or 2 wherein a Fresnel lens is formed on the projecting side of said medium.

4. A rear projection screen as claimed in claim 1 or 2 wherein said total reflection surface is formed over the entire area of said flank.

5. A rear projection screen as claimed in claim 1 or 2 wherein the angle α between said total reflection surface and the plane of the projection surface is selected to meet the condition of:

$$\alpha \geqq 90° - (\tfrac{1}{2}) \sin^{-1}(1/n)$$

where, n represents the refractive index of said medium.

6. A rear projection screen as claimed in claim 1 or 2 wherein said medium includes a light diffusion means for diffusing light impinging on the projection surface to increase the angular field of view at the viewing surface.

7. A rear projection screen as claimed in claim 6, wherein said light diffusion means includes a pigment dispersed in said medium.

8. A rear projection screen as claimed in claim 1 or 2 wherein a light absorbing layer is formed on the outer side of said reflection surface to improve the contrast of the projected image.

9. A rear projection screen as claimed in claim 1 or 2 wherein a coating layer of a substance having a refractive index smaller than the refractive index of said medium, and a light absorbing layer are applied on the outer surface of said total reflection surface.

10. A rear projection screen as claimed in claim 7, wherein said pigment comprises organic material.

11. A rear projection screen as claimed in claim 7, wherein said pigment comprises inorganic material.

12. A rear projection screen as claimed in claim 2, wherein both of said crests and troughs are provided with a lens surface.

13. A rear projection screen as claimed in claim 1 or 2 wherein said trough portions have a concave surface.

14. A rear projection screen as claimed in claim 1 or 2 wherein said trough portions have a convex surface.

15. A rear projection screen as claimed in claim 1 or 2 wherein said flank has a generally straight, flat surface.

* * * * *